United States Patent
Someda et al.

(10) Patent No.: US 9,689,974 B2
(45) Date of Patent: Jun. 27, 2017

(54) IMAGE FORMING METHOD USING ULTRASOUND AND ABERRATION CORRECTION METHOD

(75) Inventors: Yasuhiro Someda, Yokohama (JP); Kenichi Nagae, Yokohama (JP); Katsuya Oikawa, Tokyo (JP); Keishi Saito, Tokyo (JP); Yasuyoshi Takai, Kawasaki (JP); Hirofumi Taki, Kyoto (JP); Toru Sato, Kyoto (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1431 days.

(21) Appl. No.: 12/937,535

(22) PCT Filed: Apr. 3, 2009

(86) PCT No.: PCT/JP2009/057299
§ 371 (c)(1),
(2), (4) Date: Jan. 3, 2011

(87) PCT Pub. No.: WO2009/128389
PCT Pub. Date: Oct. 22, 2009

(65) Prior Publication Data
US 2011/0098568 A1  Apr. 28, 2011

(30) Foreign Application Priority Data
Apr. 14, 2008  (JP) .................. 2008-105039

(51) Int. Cl.
*A61B 8/14*  (2006.01)
*G01S 7/52*  (2006.01)
*G01S 15/89*  (2006.01)

(52) U.S. Cl.
CPC ...... *G01S 7/52049* (2013.01); *G01S 15/8952* (2013.01)

(58) Field of Classification Search
None
See application file for complete search history.

(56) References Cited

U.S. PATENT DOCUMENTS 5,052,394 A  10/1991  Carpenter
6,023,977 A   2/2000  Langdon
(Continued)

FOREIGN PATENT DOCUMENTS

CN  1732031  2/2006
CN  1972634  5/2007
(Continued)

OTHER PUBLICATIONS

Chinese Office Action, dated Sep. 25, 2012, in counterpart Chinese Application No. 200980121431. and English language translation thereof.

(Continued)

*Primary Examiner* — Joseph M Santos Rodriguez
(74) *Attorney, Agent, or Firm* — Fitzpatrick, Cella, Harper & Scinto

(57) ABSTRACT

An ultrasound image forming method comprises a first step of receiving a first signal reflected from the object, a second step of obtaining an aberration correction value based on the first signal thus received, a third step of receiving a second signal reflected from the object when a second ultrasound corrected based on the aberration correction value is transmitted to the object, and a fourth step of forming an image from the aberration correction value and the second signal. The center frequency of the second ultrasound is between 0.5 MHz and 20 MHz, the center frequency of the first ultrasound is between 3/16 and 9/20 of the center frequency of the second ultrasound. By this method, an accurate aberration correction value can be obtained and an ultrasound (Continued)

imaging with high resolution can be achieved even if aberrations are large and difficult to correct.

15 Claims, 10 Drawing Sheets

(56) References Cited

U.S. PATENT DOCUMENTS

| | | | |
|---|---|---|---|
| 6,223,599 B1 | 5/2001 | Langdon | |
| 2002/0002333 A1 | 1/2002 | Angelsen | |
| 2004/0006272 A1 | 1/2004 | Vortman et al. | 600/443 |
| 2004/0122323 A1 | 6/2004 | Vortman et al. | 600/459 |
| 2005/0277835 A1 | 12/2005 | Angelsen | |
| 2006/0106309 A1 | 5/2006 | Liu | |
| 2007/0266791 A1 | 11/2007 | Nakamura | 73/627 |

FOREIGN PATENT DOCUMENTS

| | | |
|---|---|---|
| EP | 1 757 928 | 2/2007 |
| EP | 1777543 A2 | 4/2007 |
| JP | 05-237104 A | 9/1993 |
| JP | 07-079972 | 3/1995 |
| JP | 2006-142026 | 6/2006 |
| WO | 9953309 | 10/1999 |

OTHER PUBLICATIONS

KJ Haworth et al., "Towards Aberration Correction of Transcranial Ultrasound Using Acoustic Droplet Vaporization", Ultrasound in Medicine and Biology, vol. 34, No. 3, pp. 435-445, 2008.

SE Masoy et al., "Estimation of ultrasound wave aberration with signals from random scatterers", Journal of the Acoustical Society of America, vol. 115, No. 6, pp. 2998-3009, 2004.

H Takai et al., "Evaluation of aberration parameters estimated from a low frequency transmission for medical acoustic imaging", IEEE International Ultrasonics Symposium, 2008. IUS 2008. pp. 1278-1281.

IMAGE FORMING METHOD USING ULTRASOUND AND ABERRATION CORRECTION METHOD

TECHNICAL FIELD

The present invention relates to an image forming method for forming a cross sectional or three-dimensional image of a specimen using ultrasound. The present invention also relates to an ultrasound aberration correction method for correcting acousto-optical aberrations generated in a specimen.

BACKGROUND ART

A conventional typical apparatus for forming a cross sectional image using ultrasound (or an image forming apparatus) has a transmitter portion that transmits ultrasound to a specimen (e.g. an object such as a living body to be inspected), a receiver portion that receives reflected ultrasound waves, scanning means for changing the direction of the transmitted and received ultrasound for scanning, and means for converting received reflected signals into brightness signals to visualize them. The interior of the specimen is observed using time-series cross sectional images obtained by the image forming apparatus having the above described configuration. In a type of such an apparatus, the direction of ultrasound is moved in the vertically and horizontally in a scanning manner by the aforementioned scanning means to form a three-dimensional image.

As described in patent document 1, when an ultrasound signal (which will be sometimes referred to simply as ultrasound) is transmitted or launched into a subject of inspection such as a living body, the ultrasound signal propagates in the subject and is reflected by a reflecting element(s) existing in the interior of the subject. Then, the reflected signal propagates in the subject of inspection again and is received by an ultrasound probe. In this process, there are phase differences between ultrasound waves when they reach to the ultrasound probe, since the tissue of the subject of inspection which serves as propagation medium is not homogeneous in general. Consequently, a phenomenon that an image formed from the received ultrasound waves is distorted (which is called a phase cancellation effect) occurs. The phase cancellation effect causes a distribution of delays of the reflected waves on the surface (which is sometimes also referred to as aperture or aperture surface) of the ultrasound probe from/on which the ultrasound signal is transmitted/received to deviate from theoretical values. For this reason, a significant improvement in the resolution cannot be achieved by simply increasing the aperture (aperture surface), and improvement in the image quality is difficult to achieve.

One method of solving this problem is phase conjugate transmission and reception. In the phase conjugate transmission and reception, a phase shaping addition process (which is sometimes also referred to as beam forming) is typically performed so that the directivity is automatically adjusted to the direction from which incident waves come based on the phase distribution on the aperture surface on which the incident waves are received. As a measure to solve the above described problem, this characteristic of the phase conjugate transmission and reception is used to achieve aberration correction rightly with respect to a target wave source (which is sometimes also referred to as an echo source) even in the case where the phase distribution on the incident wave receiving surface is distorted due to the sonic velocity distribution in the course of propagation. Specifically, two received wave signals are selected from among the wave signals received by a wave receiving array (which is sometimes also referred to as a receiving probe), and the inter-channel phase difference between the signals is determined. Thereafter, a non-ideal component contained in the inter-channel phase difference is obtained to determine a phase difference correction value. Then, the phase of the received wave signal is corrected using the phase correction value thus determined. The two received wave signals selected in the above process are two signals from each pair of adjacent elements among the ultrasound elements that constitute the wave receiving array, or alternatively the average of the signals from all the elements and a signal from each element. In the calculation of the phase correction value, cross-correlation calculation is used, as described in patent document 2. Here, the aforementioned "element" refers to a basic individual unit composed of one or plurality of ultrasound transducer(s) used to transmit and receive ultrasound.

Another method of aberration correction disclosed in patent document 3 includes a step of transmitting a first wave front from an array probe, and a step of determining an aberration correction value based on an obtained wavefront. This method further includes a step of transmitting a second wavefront reflecting the aberration correction value from the array probe, and a step of forming an image from an obtained second wave front. The first wavefront may be transmitted as a narrow beam in order to enhance accuracy of the phase, and the second wavefront may be transmitted as a wide beam in order to increase the scanning speed.

Non-patent document 1 discloses an attempt for enhancing accuracy of correction by repeatedly performing the method disclosed in patent document 1. According to methods disclosed in Patent documents 4 and 5, aberration correction is performed using one of the fundamental frequency and a harmonic frequency, while imaging is performed using the other.

CITATION LIST

Patent Literature

[PTL 1] Japanese Patent Application Laid-Open No. 5-237104
[PTL 2] Japanese Patent Application Laid-Open No. 7-79972
[PTL 3] Japanese Patent Application Laid-Open No. 2006-142026
[PTL 4] U.S. Pat. No. 6,023,977
[PTL 5] U.S. Pat. No. 6,223,599

Non Patent Literature

[NPL 1] "Estimation of ultrasound wave aberration with signals from random scatterers", J. Acoust. Soc. Am. 115(6), 2004.

SUMMARY OF INVENTION

Technical Problem

In the conventional methods, it is possible to correct signals (or reflected waves) coming from a target object (which is also referred to as a measurement target object) for which the reflection intensity is higher than a certain level, like in the case of reflection from a point target. However, the conventional methods have a drawback that it is difficult to correct signals (or reflected waves) coming from a target object for which the reflection intensity is weak or lower than a certain level, like in the case of reflection from a small scatterer, because the degree of correlation between the signals is low. Therefore, in the conventional aberration correction method disclosed in patent document 1, phase error measurement is required to be performed also on speckle components of weak, inhomogeneous reflected waves (or echo) generated from a medium existing in the vicinity of the target object that generates signals (reflected waves) including sound rays for which aberration correction is to be made. However, speckle components (or signals from a small scatterer) are instable components which can be discussed only by their statistical characteristics, and measurement thereof requires integration over a certain sectional length of echo, unlike with phase measurement for a point target. Furthermore, due to the presence of peripheral signals (which are also referred to as side lobes), which disturb phase measurement of the signal to be measured (which is also referred to as main lobe), in a ultrasound probe, an echo from a reflection point other than the target object but located on the same circle as the object is received in some cases. Such reception of an echo causes an error in aberration correction.

In the method disclosed in patent document 1, the aforementioned error in aberration correction attributed to side lobes can be reduced to some extent by collecting data only on the echo from the target that contains a Doppler component. However, in cases, for example, where the subject of inspection is a living body or the like, the method can only be applied to blood flow and other moving portions, and its range of application is greatly limited.

In non-patent document 1, accuracy of correction is intended to be enhanced by improving the same method by repetition. However, it has been reported that this method has a problem in handling data having a low degree of correlation.

On the other hand, in cases where a narrow beam (i.e. a bundle of sound rays) is used as the first wavefront as described in patent document 3, a high frequency range is generally used. In cases where a wide beam is used as the second wavefront, a low frequency range is generally used, or alternatively the beam diameter is controlled by delay or aperture control etc. without changing the frequency. In this case, while use of a high frequency range to provide a narrow beam leads to an increase in the sensitivity to the phase, there arises a problem that a phase change larger than one cycle occurs and alignment of wavefronts cannot be achieved (which problem is sometimes referred to as aliasing). On the other hand, if a low frequency is used to prevent aliasing, there arises another problem that an adequate resolution cannot be achieved.

The methods described in patent documents 4 and 5 depend on the assumption that aberration correction can be achieved at the fundamental frequency or a harmonic frequency. However, these documents disclose no solution for cases where the magnitude of aberrations is so large that it is difficult to correct the aberrations. According to findings by the inventors of the present invention, highly accurate aberration correction values cannot be necessarily obtained only by using ultrasounds having two different frequencies, but the effect of correction is small or sometimes rather detrimental in some pair of frequencies used.

The directivity of ultrasound is generally evaluated using a graph having a horizontal axis representing the direction or position and a vertical axis representing the signal intensity. However, it has been difficult to quantitatively evaluate a beam having a high directivity and high side lobes and a beam having a relatively low directivity and low side lobes. Although this also applies to cases where the aberration correction disclosed in patent documents 4 and 5 is performed, these patent documents 4 and 5 disclose nothing about evaluation of aberrations and the frequency.

The present invention has been made in view of the above described problem and has as an object to provide a method of calculating accurate aberration correction values even in cases where the amount of aberrations is large and difficult to correct, and a method of achieving a high-resolution ultrasound imaging using such aberration correction values.

Solution to Problem

To achieve the above object, the inventors have conducted strenuous studies to achieve the present invention. The present invention has been made based on a finding that use of low frequencies in transmission and reception facilitates correlation among signals received by receiving elements and improves the accuracy of aberration correction, and a finding that transmission and reception at high frequencies is better in terms of resolution than transmission and reception at low frequencies. Furthermore, the present invention has been made also based on a finding that frequency dependency of aberration correction amounts is low, and a finding that there are optimum high and low frequencies used in aberration correction.

The present invention has been made based on the above findings and provides, according to its essence, an image forming method for forming an image using a signal reflected from an object when an ultrasound is transmitted to the object, comprising:

a first step of receiving a first signal reflected from the object when a first ultrasound is transmitted to the object;

a second step of obtaining an aberration correction value based on the first signal thus received;

a third step of receiving a second signal reflected from the object when a second ultrasound corrected based on the aberration correction value is transmitted to the object; and a fourth step of forming an image from the aberration correction value and the second signal, wherein a center frequency of the second ultrasound is not lower than 0.5 MHz and not higher than 20 MHz, and a center frequency of the first ultrasound is not lower than $3/16$ and not higher than $9/20$ of the center frequency of the second ultrasound.

According to the present invention, there is also provided an image forming method for forming an image using a signal reflected from an object when an ultrasound is transmitted to the object, comprising:

a first step of receiving a signal reflected from the object when an ultrasound containing at least a first ultrasound and a second ultrasound having different center frequencies is transmitted to the object;

a second step of separating the received signal into a first signal and a second signal, the first signal being indicative of a reflected wave of the first ultrasound, and the second signal being indicative of a reflected wave of the second ultrasound;

a third step of obtaining an aberration correction value based on the first signal thus separated; and a fourth step of forming an image from the aberration correction value and the second signal, wherein a center frequency of the second ultrasound is not lower than 0.5 MHz and not higher than 20 MHz, and a center frequency of the first ultrasound is not lower than 3/16 and not higher than 9/20 of the center frequency of the second ultrasound.

According to the present invention, there is further provided an aberration correction method for correcting aberrations using a signal reflected from an object when two or more ultrasounds having different frequencies are transmitted to the object, comprising:

a first step of receiving a first signal reflected from the object when a first ultrasound is transmitted to the object, and a second step of obtaining an aberration correction value based on the first signal thus received, wherein a center frequency of the second ultrasound is not lower than 0.5 MHz and not higher than 20 MHz, and a center frequency of the first ultrasound is not lower than 3/16 and not higher than 9/20 of the center frequency of the second ultrasound.

According to the present invention, there is still further provided an aberration correction method for correcting aberrations using a signal reflected from an object when two or more ultrasounds having different frequencies are transmitted to the object, comprising:

a first step of receiving a signal reflected from the object when an ultrasound containing at least a first ultrasound and a second ultrasound having difference center frequencies is transmitted to the object;

a second step of separating the received signal into a first signal and a second signal, the first signal being a reflected wave of the first ultrasound, and the second signal being a reflected wave of the second ultrasound; and a third step of obtaining an aberration correction value based on the first signal thus received, wherein a center frequency of the second ultrasound is not lower than 0.5 MHz and not higher than 20 MHz, and a center frequency of the first ultrasound is not lower than 3/16 and not higher than 9/20 of the center frequency of the second ultrasound.

Advantageous Effects of Invention

According to the present invention as described above, even in cases where aberrations are large and difficult to correct, an ultrasound imaging with high resolution can be achieve by selecting an optimum frequency used in the aberration correction processes and obtaining accurate aberration correction value.

DESCRIPTION OF THE EMBODIMENTS

Figure 1:
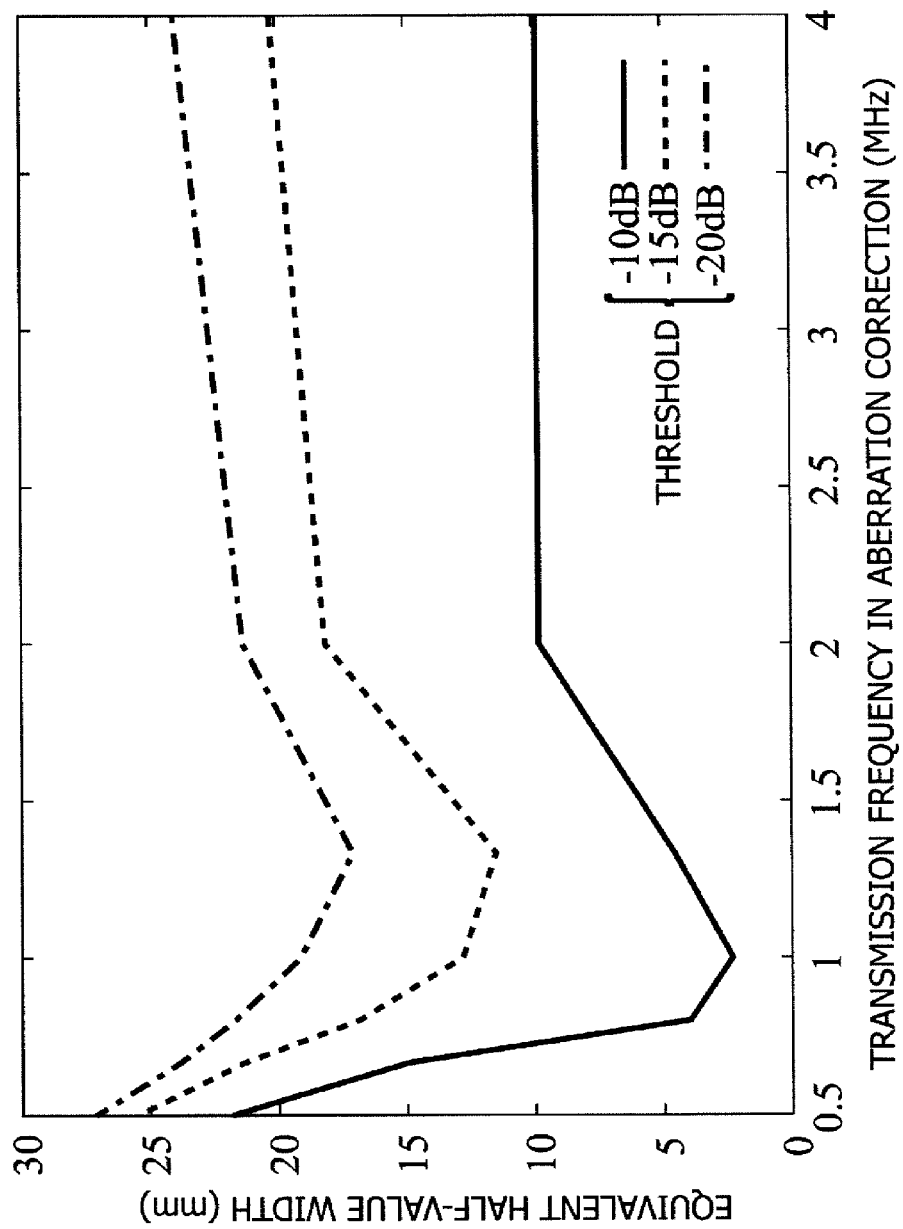
FIG. 1 is a graph illustrating frequencies and equivalent half-value widths according to the present invention.

In the present invention, ultrasound used in the aberration correction process is defined as first ultrasound, and ultrasound used in the frequency imaging process are defined as second ultrasound waves.

In the present invention, image formation is not essential. Only aberration correction data obtained by aberration correction method according to the present invention may be utilized as analytical data etc.

In the present invention, the following fact is taken into consideration, that is, in order to achieve good aberration correction, it is necessary to select a suitable frequency used in the aberration correction process and a suitable frequency used in the imaging process, and to evaluate beam characteristics. In the conventional aberration correction methods, there are no criteria for determining whether aberration correction is effectively achieved or not. The inventors of the present invention made studies to find the above fact.

Specifically, it is preferred that beam characteristics be evaluated using an evaluation function defined below.

$$E = \sum (I(x) - P_T) i(x) j(x) \Delta x \Big/ \sum (I(x) - P_T) i(x) \Delta x \quad (1)$$

$$i(x) = \begin{cases} 1: I(x) > P_T \\ 0: \text{other than above} \end{cases}$$

j(x): weighting function
I(x): transmitted beam power normalized by maximum power
$P_T$: threshold
x: position The weight function satisfies the following condition by definition.

$$j(x) = \begin{cases} x^a: \text{within main beam region} \\ bx^c: \text{outside main beam region} \end{cases} \quad (2)$$

a, b, c: arbitrary real numbers

Here, the evaluation function in which the parameters in the weight function are set as a=c=2 and b=1 is defined as the equivalent half value width.

In the present invention, a preferable range of the frequency (the second frequency) of the ultrasound (the second ultrasound) used in the imaging process is 0.5 MHz to 20 MHz. A more preferable range is 0.7 MHz to 15 MHz. The most preferable range is 1 MHz to 12 MHz. It is preferred that the center frequency of the second ultrasound used in the imaging process be determined based on the requirements for the degree of precision, the resolution and the definition (or fineness) of the image to be formed.

In the present invention, a preferable range of the frequency (the first frequency) of the ultrasound (the first ultrasound) used in the aberration correction process is 3/16 (18%) to 9/20 (45%) of the center frequency of the aforementioned second ultrasound.

In the following, a method of aberration correction in ultrasound imaging according to the present invention will be described. The imaging method comprises two stages of transmission/reception of ultrasound. In the first stage, the amount of aberrations is measured by transmitting and receiving ultrasound in a lower frequency range (first ultrasound). Specifically, ultrasound waves (or first signals) are emitted from a multi-element transducer (i.e. a ultrasound transmitter/receiver having a plurality of elements) and the reflected ultrasound waves (or first signals) are received by the respective elements (the first step). Then, delay correction among the elements associated with focus and steering is performed, and thereafter phase differences between elements are calculated by cross-correlation calculation. The method of cross correlation calculation used herein is the same as that described in patent document 2. Specifically, a certain portion of each received signal is extracted as a cross-correlation calculation portion, and received signals thus obtained of two adjacent elements are subjected to cross-correlation calculation. A time difference $\Delta\tau$ between the adjacent elements is determined based on the position at which the peak of the obtained cross-correlation function exist. Such time differences $\Delta\tau$ are obtained for all the adjacent received signal pairs. The time differences $\Delta\tau$ thus obtained are successively summed up, where the time of arrival of the received signal at, for example, the first element is used as the datum point. Thus, the time differences $\Delta\tau$ of the respective received signals relative to the datum or reference received signal are determined. The time differences $\Delta\tau$ thus obtained are stored in the apparatus as time delay amounts (i.e. aberration correction values) for the respective elements (the second step).

Before the third step, which will be described later, the first step and the second step are performed several times repeatedly to correct again correction values once obtained. By such repetitions of the process, the accuracy of the correction values can be further enhanced. In the repetition process, the first ultrasound waves in the second and succeeding repetition are those which have been corrected using aberration correction values determined in the most recent second step.

The frequency of the ultrasound waves used in the above process need not be fixed to a single frequency (center frequency), but it may be changed (increased or decreased) from one step to another. According to a finding by the inventors of the present invention, the accuracy of the correction values can be improved by gradually increasing the frequency (for example, by changing the frequency of the ultrasound waves used in the last step by 5% to 50%). The frequency need not be increased every time, but in some steps the frequency of the ultrasound waves used in the last step may be maintained or decreased according to the obtained signals. In order to enhance the accuracy of the correction values, it is preferred that the center frequency of the ultrasound waves (the second ultrasound waves) used in the image formation process be made higher than the center frequency of the first ultrasound waves used in the last step. It is considered that this is because the higher the frequency is, the higher the resolution is.

In the second stage, imaging is performed by transmitting and receiving ultrasound waves (second ultrasound waves) for which aberrations are corrected. Specifically, ultrasound waves that are corrected by delay amounts measured in the first stage are transmitted, and ultrasound waves reflected from an object and received by the transducer are also subjected to similar delay correction process (the third step). Thus, appropriate aberration correction can be achieved in transmitting and receiving ultrasound waves. Then, an image is formed from the second signals after aberration correction (the fourth step). The frequency of the second ultrasound waves used in the image formation process is designed to be higher than the frequency of the first ultrasound waves.

It is preferred that the combination of the first frequency used in the aberration correction process and the second frequency used in the image formation process be selected in such a way that the aforementioned equivalent half-value width falls within a certain range. FIG. 1 shows the equivalent half-value width of the transmitted beam having a second frequency of 4 MHz produced using aberration correction values obtained by transmitting ultrasound waves of first frequencies in the range of 0.5 MHz to 4 MHz. In the graph shown in FIG. 1, the horizontal axis represents the frequency of the ultrasound waves (first ultrasound waves) used in the aberration correction process. The vertical axis represents the equivalent half-value width. The smaller the equivalent half-value width is, the more the ultrasound waves are focused on the target position.

According to a finding by the inventors of the present invention, in order to form finer images, it is necessary to make the equivalent half-value width smaller than a certain level and to make the effect of the side lobes smaller than a certain level. According to a finding by the inventors, in the case where only the main lobe is evaluated as the half-value width in aberration correction, the threshold value is −10 dB. The equivalent half-value width at which the curve corresponding the threshold value of −10 dB in FIG. 1 starts to change is 8 mm. Therefore, it is preferred that the equivalent half-value width be equal to or smaller than 8 mm, and the threshold value be equal to or smaller than −10 dB.

From the above follows that if an equivalent half-value width of 8 mm with a threshold value of −10 dB is to be achieved, frequencies in the range of 0.75 MHz to 1.8 MHz are suitable as the first frequency used in obtaining aberration correction values, but frequencies not lower than 2 MHz and frequencies not higher than 0.6 MHz are not suitable. It is considered that this is because at high frequencies, aberration correction values are likely to include difference equal to a few multiples of the wavelength, and at low frequencies, the accuracy of aberration correction values tends to be deteriorated. In a case where the aforementioned value is to be achieved, it is considered that the optimum value of the first frequency is not lower than 3/16 and not higher than 9/20 of the second frequency, though the optimum value varies to some extent depending on the state of the medium and the threshold value.

The result of study presented above shows the relationship in a case where ultrasound waves having a center frequency of 4 MHz are used as the second ultrasound waves, and ultrasound waves having a center frequency in the range of 0.5 MHz to 4 MHz are used as the first ultrasound waves. According to a finding by the inventors, this relationship is not limited to the above described frequency range, but it also applies to the frequency range of the first ultrasound waves used to obtain correction values at least in cases where ultrasound waves having a frequency in the range of 0.5 MHz to 20 MHz are used as the second ultrasound waves. It is considered that this is because of the following reason. Since the relationship between the first frequency and the second frequency is mainly determined by the accuracies in phase measurement corresponding respectively thereto, it is considered that the ratio of them can also be applied to other frequencies if the same accuracy is to be achieved in phase measurement. For example, in a case where a second frequency of 20 MHz is used, the range of optimum first frequencies is 3.75 MHz to 9 MHz.

Figure 2:
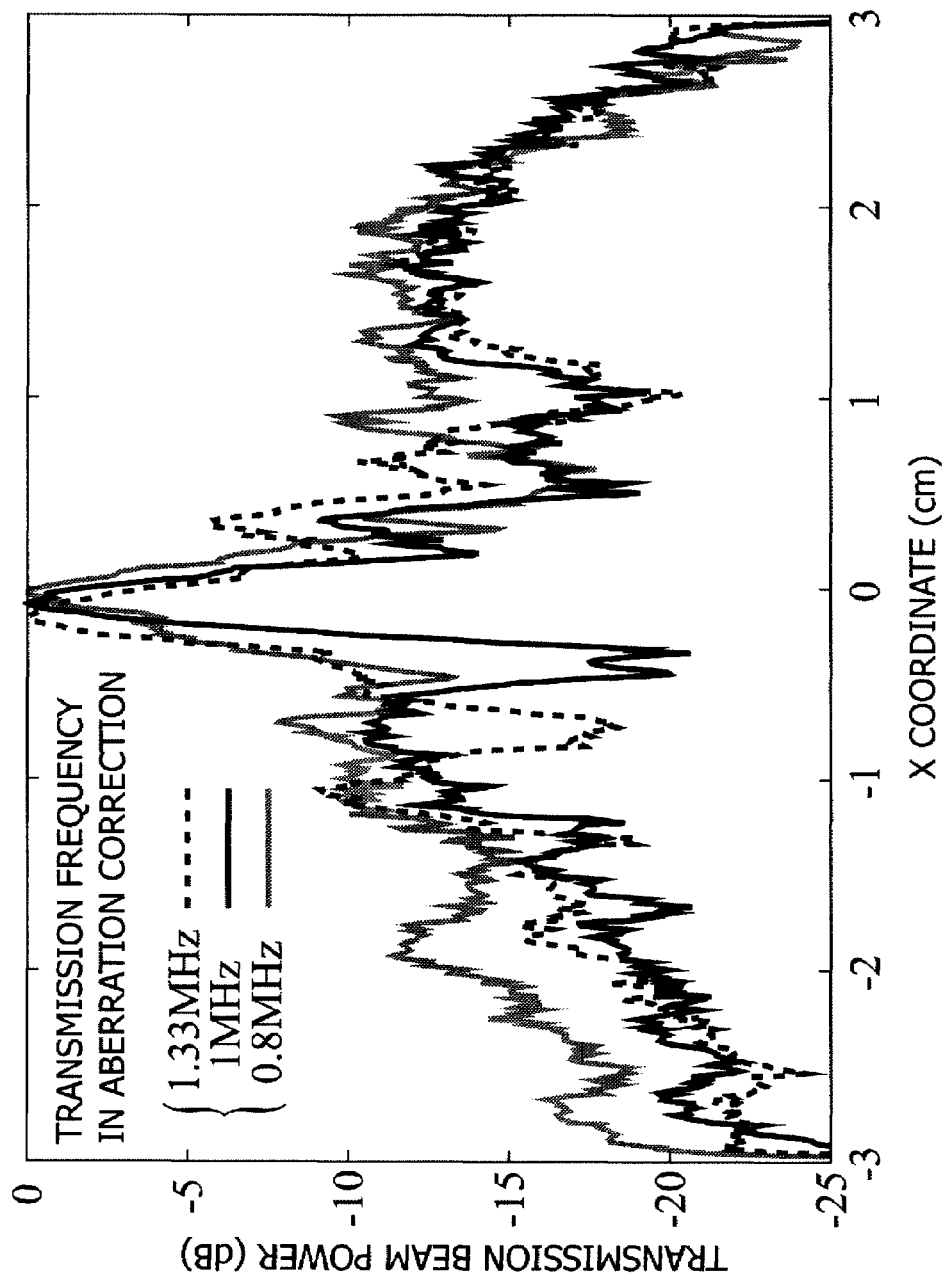
FIG. 2 illustrates transmission frequencies used in aberration correction and beam patterns according to the present invention.
Figure 3:
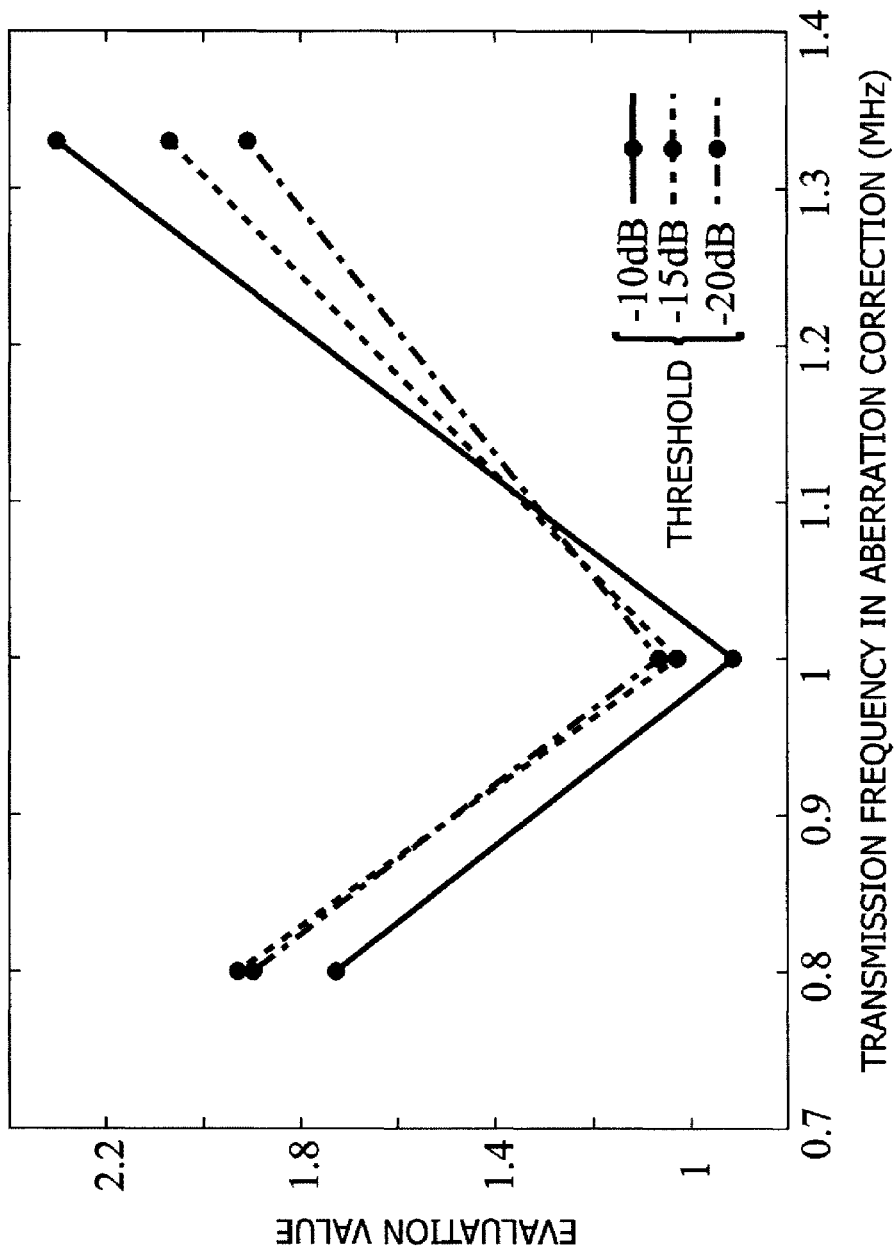
FIG. 3 illustrates transmission frequencies used in aberration correction and evaluation functions according to the present invention.
Figure 4:
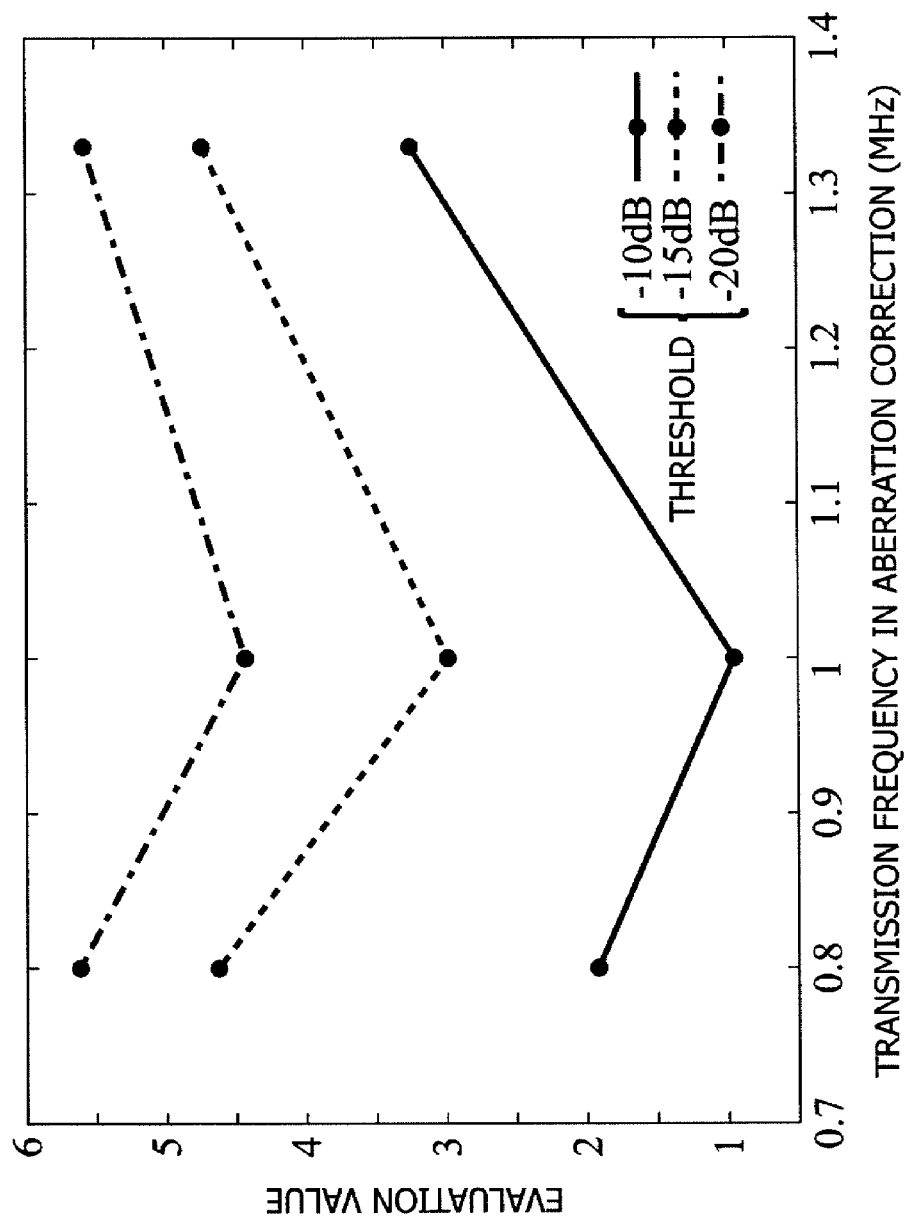
FIG. 4 illustrates transmission frequencies used in aberration correction and evaluation functions according to the present invention.

Since the evaluation function in the case of the equivalent half-value width is the variance of the transmission power about the target point of focusing, it is necessary, in order to form a finer image, to use ultrasound waves in which variations of the transmission power from the target point are small. The equivalent half-value width can be used to evaluate both the width of the main beam and the displacement of the beam forming position. However, the equivalent half-value width has a drawback that farther from the target point the position at with a side lobe is formed is, the more greatly the side lobe affects the evaluation value. Therefore, an evaluation function may be determined in the following way to perform optimum correction. FIG. 2 shows transmitted beam patterns (or power distributions) in beams having a frequency of 4 MHz in the cases where aberration correction values are obtained using transmission frequencies of 1.33 MHz, 1 MHz and 0.8 MHz respectively. In FIG. 2, the horizontal axis represents the x coordinate, and the vertical axis represents the transmitted beam power. The beam pattern obtained by the aberration correction using the frequency of 1 MHz is more advantageous in terms of the main beam width and the side lobe level than the other two patterns. However, if the threshold is set to −15 dB or −20 dB, it is considered to have an equivalent half-value width that is larger than that of the beam pattern obtained by the aberration correction using the frequency of 1.33 MHz due to the power of side lobes in the peripheral region. As will be understood from this, in the case where the equivalent half-value width is used as the evaluation function, it is sometimes difficult to select an optimal value of the first frequency. In view of this, in cases where evaluation using the equivalent half-value width can be inappropriate, a function as described in the following may be selected. Since what matters with side lobes is their power irrespective of their position, parameters relating to the position are unnecessary in evaluating side lobes. Therefore, different functions may be used as weighting function within the main beam region and outside the main beam region respectively, and parameter c may set to zero (c=0) outside the main beam region (which is sometimes referred to as the main lobe) to eliminate a function of the position. FIGS. 3 and 4 show evaluation values of the respective transmit beam patterns shown in FIG. 2 in cases where the parameters of the weighting function are set, respectively as a=2, b=1, and c=0 (FIG. 3), and a=2, b=10, and c=0 (FIG. 4). With any of these evaluation functions, the first frequency can be set to 1 MHz, and an improvement to the case with the equivalent half-value width is achieved. As above, it is also advantageous to use an evaluation function that uses different functions as weighting functions within the main beam region and outside the main beam region respectively and free from a function of the position outside the main beam region.

In the following, a description will be made of another mode of the present invention, where the first ultrasound (or component) and the second ultrasound (or component) are synthesized into the same single ultrasound signal when transmitted. What is described here is a method of ultrasound imaging utilizing an aberration correction technique in a case where a wide band ultrasound signal (or composite ultrasound waves of a plurality of ultrasound waves having different center frequencies) is transmitted. When the amount of aberrations is large, aberration correction values are obtained using the first frequency component having a frequency adequately lower than the frequency of the second frequency component used in imaging. In the imaging process, the entire measurement space is scanned once with a wide band ultrasound transmission beam containing two or more ultrasound frequency components having different center frequencies (first step). Then, the first frequency component (or first signal) and the second frequency component (or second signal) are separated out or extracted from the received signal using a first band pass filter and a second band pass filter respectively (second step). The optimum pass band (i.e. the frequencies that are allowed to pass) of the first band pass filter depends on the amount of aberrations. A preferred range of the pass band is not lower than 3/16 (18%) and not higher than 9/20 (45%) of the pass band of the second band pass filter. Aberration correction values are calculated first using the first frequency component (third step). Then, the correction values calculated using the first frequency component are further corrected (or improved) using the second frequency component, and thereafter an ultrasound image is formed from the second frequency component using the correction values obtained by the second correction (fourth step). According to this method, aberration correction with respect to all the measurement directions and image formation are achieved by only one scanning using a wide band ultrasound signal. Thus, a high time resolution can be achieved.

In order to obtain accurate correction values by calculation even in a case where the medium in which ultrasound waves propagate is an inhomogeneous medium in which a small scatterer(s) (which is sometime referred to as a weak scatterer) is present, it is also preferred that the frequency of the first ultrasound and the frequency of the second ultrasound be selected in such a way that the following relationship is satisfied. That is, it is preferred that the center frequency of the first ultrasound (i.e. ultrasound used in the aberration correction process) be not lower than 3/16 (18%) and not higher than 9/20 (45%) of the center frequency of the second ultrasound (i.e. ultrasound waves used in the image formation process). Therefore, it is necessary that the fractional bandwidth (i.e. the value obtained by dividing the bandwidth by the center frequency) of the probe used in transmitting and receiving ultrasound signals be within the range of 75.8% to 137%, because it is necessary for the probe to transmit and receive the first ultrasound and the second ultrasound. In the above described case where the frequency of the ultrasound used in the aberration correction process is 1 MHz and the frequency of the ultrasound used in the image formation process is 4 MHz, the fractional bandwidth is 83%. However, it is necessary that an adequately large bandwidth be provided for each center frequency. In view of the above, it is desirable, for example, that a bandwidth larger than 100% is provided, or adequate bandwidths are provided for the center frequency of the first ultrasound (e.g. 1 MHz) and the center frequency of the second ultrasound (e.g. 4 MHz) respectively.

As described in the foregoing, the relationship between the frequencies (or center frequencies) of the first ultrasound and the second ultrasound in the case where a wide band ultrasound signal is used is the same as that in the case where the first ultrasound and the second ultrasound are used separately.

Embodiments

Although, a medical ultrasound diagnosis apparatus will be described as an exemplary embodiment of the ultrasound apparatus, the present invention is not limited to the medical ultrasound diagnosis apparatus, but it can be applied also to other apparatuses using ultrasound in similar manners. In the following, embodiments of the present invention will be described in detail with reference to the drawings. It should be understood, however, that the present invention is by no means limited by the following description.

First Embodiment (Transmission/Reception of First Ultrasound)

Figure 5:
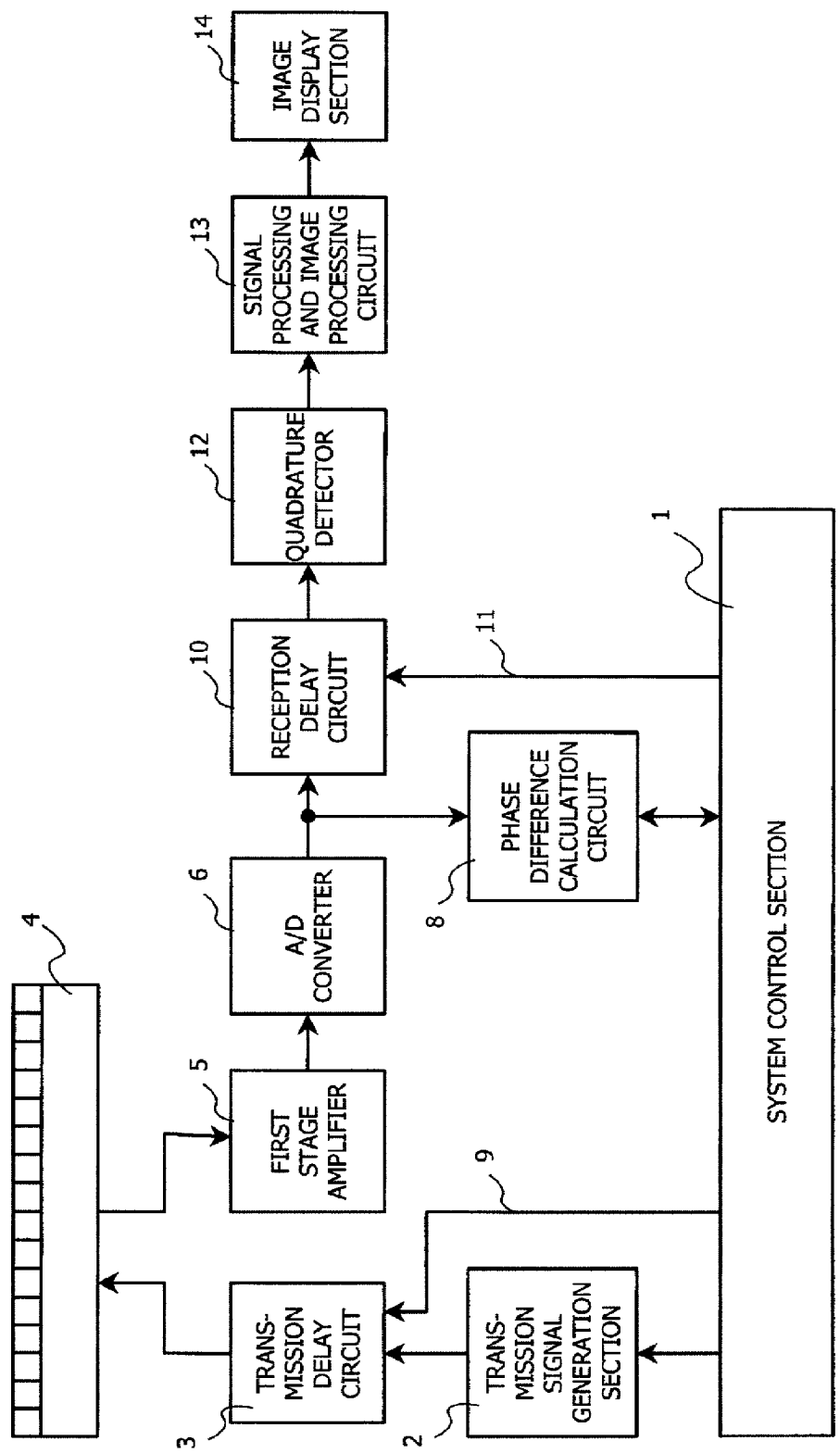
FIG. 5 is a block diagram of an ultrasound apparatus for illustrating a first embodiment.

FIG. 5 is a block diagram of the ultrasound apparatus according to a first embodiment of the present invention. The apparatus shown in FIG. 5 has a system control section 1 that performs overall control of the ultrasound apparatus and a transmission signal generating section 2 that generates ultrasound (waves) to be transmitted. The transmission signal generating section 2 receives a transmission trigger input from the system control portion 1. Then, transmission pulse modulation and power amplification are performed after delay set in the transmission delay circuit 3 provided for each element, and transmission signals for the respective elements are supplied to the probe 4. The probe 4 is an ultrasound probe that performs conversion between electrical signals and ultrasounds (or ultrasound waves). The probe 4 has n elements arranged in rectangular shape.

The transmitted ultrasound waves are reflected by an object, and the ultrasound waves thus reflected are received by the ultrasound probe 4 and converted into electrical signals. The electrical signals thus generated upon reception are amplified by a first stage amplifier 5, and converted into digital signals by an analogue-to-digital converter 6.

(Measurement of Aberration Amount)

Then, phase differences of the ultrasound signals between the elements are calculated by a phase difference calculation circuit 8. Specifically, delay corrections with respect to the focusing and direction of the transmitted and received beams are performed for the signals obtained from the respective elements, and relative phase errors between elements are determined by calculating cross correlations of phase errors remaining after the delay corrections between adjacent elements. Thereafter, phase difference amounts from the average of all the relative phase difference are calculated, and they are converted into equivalent delay amounts, which are stored as aberration correction values (i.e. values used to correct delay amount errors) in the system control section 1.

(Transmission/Reception of Second Ultrasound)

Then, the process of transmission and reception of ultrasound waves similar to that described above is performed. In this case, the frequency of the transmitted ultrasound waves is set higher than the frequency in the above described first transmission/reception. The phase difference calculation circuit 8 does not operate this time. Upon transmitting ultrasound waves, the aberration correction values 9 stored in the system control circuit 1 are input to the transmission delay circuit 3. Delay amounts associated with focusing and beam directions are also supplied to the transmission delay circuit 3. Then, after the corresponding delays, transmission pulse modulation and power amplification are performed, and transmission signals for the respective elements are supplied to the probe 4.

After transmission of ultrasound waves to a specimen by the probe 4, ultrasound waves reflected by an object are received by the probe 4, and digital signals corresponding to the respective elements are generated through the first stage amplifier 5 and the analogue-to-digital converter 6 and output in a similar manner as the case of the above-described first reception.

(Aberration Correction)

The signals thus generated are input to a reception delay circuit 10. Delay amounts associated with focusing and beam directions and aberration correction values 11 stored in the system control section 1 in the first transmission/reception process are supplied to the reception delay circuit 10. Thus, the signals from the respective elements are delayed by appropriate delay amounts.

(Signal Processing and Image Output)

The signals of the respective elements that have been delayed as above are detected by a quadrature detector 12, and signals are processed by a signal processing and image processing circuit 13, where geometric averaging of I and Q signals and conversion into luminance signals are performed. Thereafter, an image is output to an image display section 14.

Figure 6:
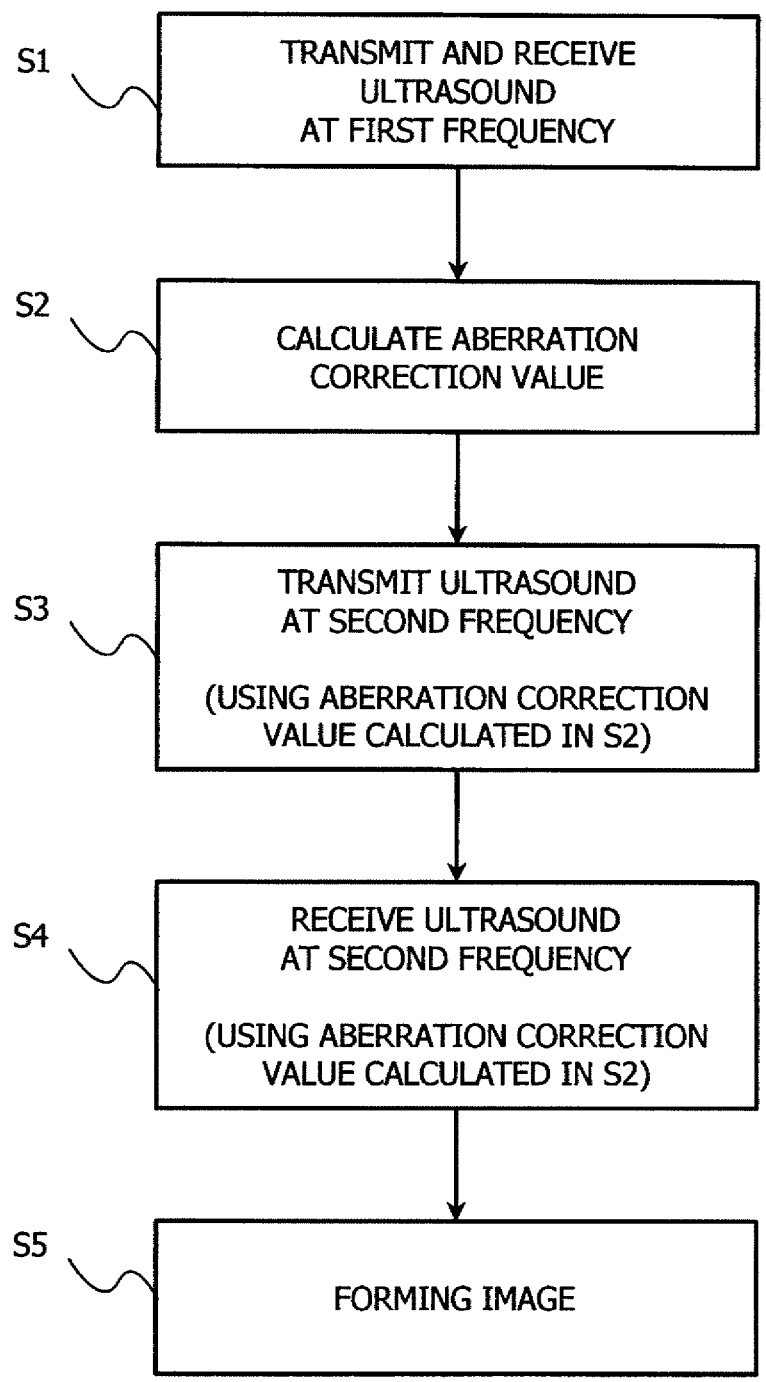
FIG. 6 is a flow chart of a process of aberration correction and imaging for illustrating the first embodiment.

FIG. 6 is a flow chart of the above described process. As described above, first ultrasound waves having a first frequency are transmitted, and first signals reflected from an object are received (S1). Then, aberration correction values are calculated by the phase difference calculation circuit 8 based on the first signals received in step S1 and stored in the system control section 1 (S2). Then, second ultrasound waves having a second frequency are transmitted (S3). In this step, the aberration correction values obtained by the first transmission/reception and stored in the system control section 1 are applied. Then, second signals reflected from the object are received (S4). The aberration correction values obtained by the first transmission/reception and stored in the system control section 1 are applied also to the second signals thus received. An image is formed from the second signals after aberration correction.

Figure 7:
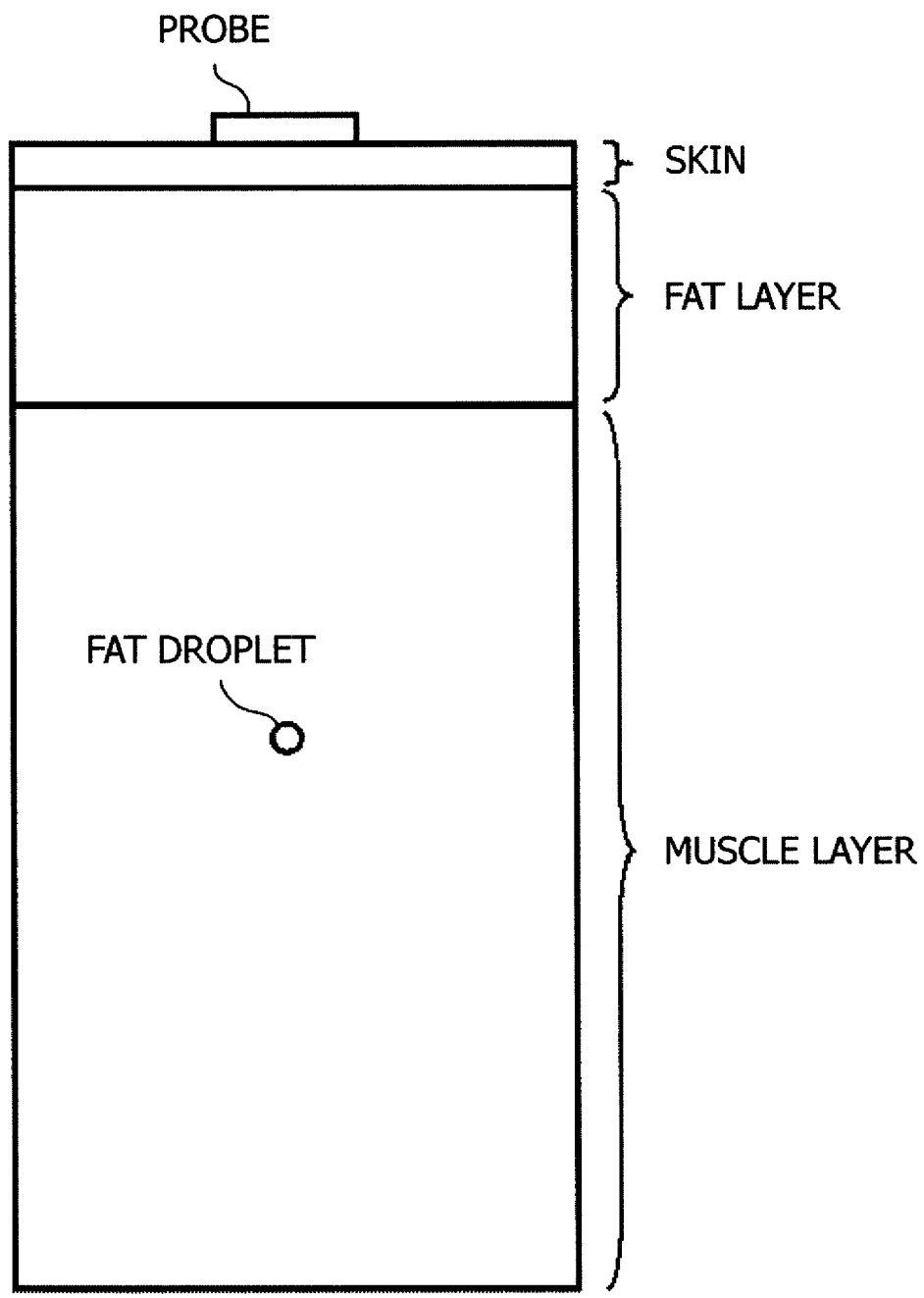
FIG. 7 is a diagram illustrating a simulation model for illustrating the first embodiment.

A result of a simulation of transmission and reception of ultrasound using the above described method will be described in the following. In this embodiment, first ultrasound having a center frequency of 1 MHz and second ultrasound having a center frequency of 4 MHz were used. An array transducer having 16 (sixteen) elements, an element width of 0.5 mm, and an element distance of 0.6 mm was used to transmit and receive ultrasound. In the simulation, use was made of a body model including a fat layer having a thickness of 2 cm and a muscle layer provided under it that contains a fat droplet at a depth of 5 cm as shown in FIG. 7. For comparison, similar simulation was also performed as a comparative example, where ultrasound having a center frequency of 4 MHz was used as both the first ultrasound and second ultrasound.

Figure 8:
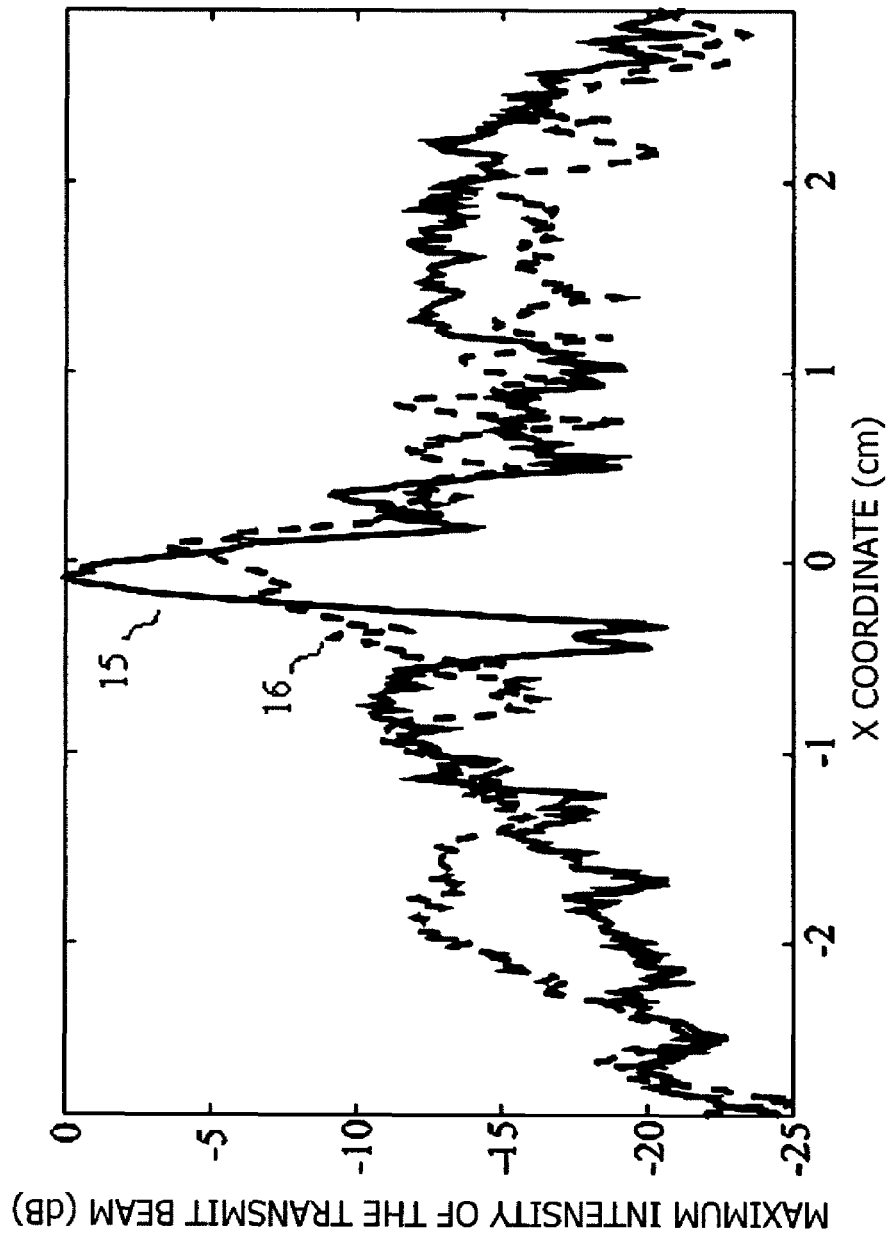
FIG. 8 shows beam patterns for illustrating the first embodiment.

FIG. 8 shows the result of calculation. FIG. 8 shows the directivity of the transmitted second ultrasound beam in transmission and reception according to the embodiment and the comparative example. In FIG. 8, solid line 15 represents the result of calculation according to the present invention (where the first ultrasound having a frequency of 1 MHz and the second ultrasound having a frequency of 4 MHZ were used), and broken line 16 represent the result of calculation according to the comparative example (where the first ultrasound and the second ultrasound both having a frequency of 4 MHz were used). The half-value width of the beam was measured to be 1.77 mm in transmission and reception according to the embodiment, and 3.51 mm in transmission and reception according to the comparative example. Advantages of the method according to the embodiment was verified by the above described simulation. Thus, in a case where a B mode image is formed according to the method of this embodiment, a resolution approximately twice as high as that in the case of the comparative example can be achieved.

Although in this embodiment the phase differences are calculated by cross correlation calculation, the same advantageous effect can also be achieved by measuring the phases of the signals from quadrature detection outputs. Although the beam directivity and B mode image have been discussed in the description of this embodiment, the present invention can be applied to image forming methods using ultrasound in general. For example, the present invention can also be applied to diagnostic apparatuses that use ultrasound tomography in general having functions of extracting a M mode image, C mode image, and/or 3D image and/or multi-stage focus control etc. The present invention is also applicable to treatments such as puncture, HIFU (High-Intensity Focused Ultrasound), intraoperative ultrasound, ultrasound lithotrity, and endoscopic ultrasound. Furthermore, the present invention can also be applied to apparatuses that require convergence of ultrasound beam such as ultrasound flaw detection apparatus, besides diagnostic apparatuses.

Although in this embodiment aberration correction values used in beam forming for image formation in steps S4 and S5 in FIG. 6 are the same as those used in transmission in step S3, aberration correction values improved (or further corrected) using the second signals received in step S4 may be used. This will further improve the accuracy of aberration correction. It is also preferred that the process of steps S1 and S2 be performed multiple times to provide improved aberration correction values. In cases where the process of step S1 and S2 is performed multiple times, it is preferred that the center frequency of the first ultrasound waves used in step S1 be increased gradually. In this case, initial aberration correction values are first determined at a low frequency at which determination of correlation between signals is easy, and then improvement of the correction values is performed multiple times with the frequency being made gradually closer to the frequency of the second ultrasound waves used in the image formation process. Thus, correction values suitable for aberration correction on transmitted and received ultrasound waves used in the image formation process can be determined easily with a high degree of accuracy. The center frequency of the second ultrasound waves used in the image formation process is designed to be higher than or equal to the center frequency of the first ultrasound waves used in the last aberration correction process.

In a case where the center frequency of the first ultrasound waves is gradually increased in order to obtain more accurate aberration correction values as descried above, the center frequency of the first ultrasound waves used in last aberration correction process and the center frequency of the second ultrasound waves should satisfy the above described relationship, that is, the center frequency of the second ultrasound waves should be higher than or equal to the center frequency of the first ultrasound waves used in the last aberration correction process.

The condition that the center frequency of the first ultrasound waves is not lower than 3/16 and not higher than 9/20 of the center frequency of the second ultrasound waves required according to the present invention refers to the relationship between the center frequency of the first ultrasound waves that are transmitted first to obtain aberration correction values and the center frequency of the second ultrasound waves used in image formation.

Second Embodiment

Figure 9:
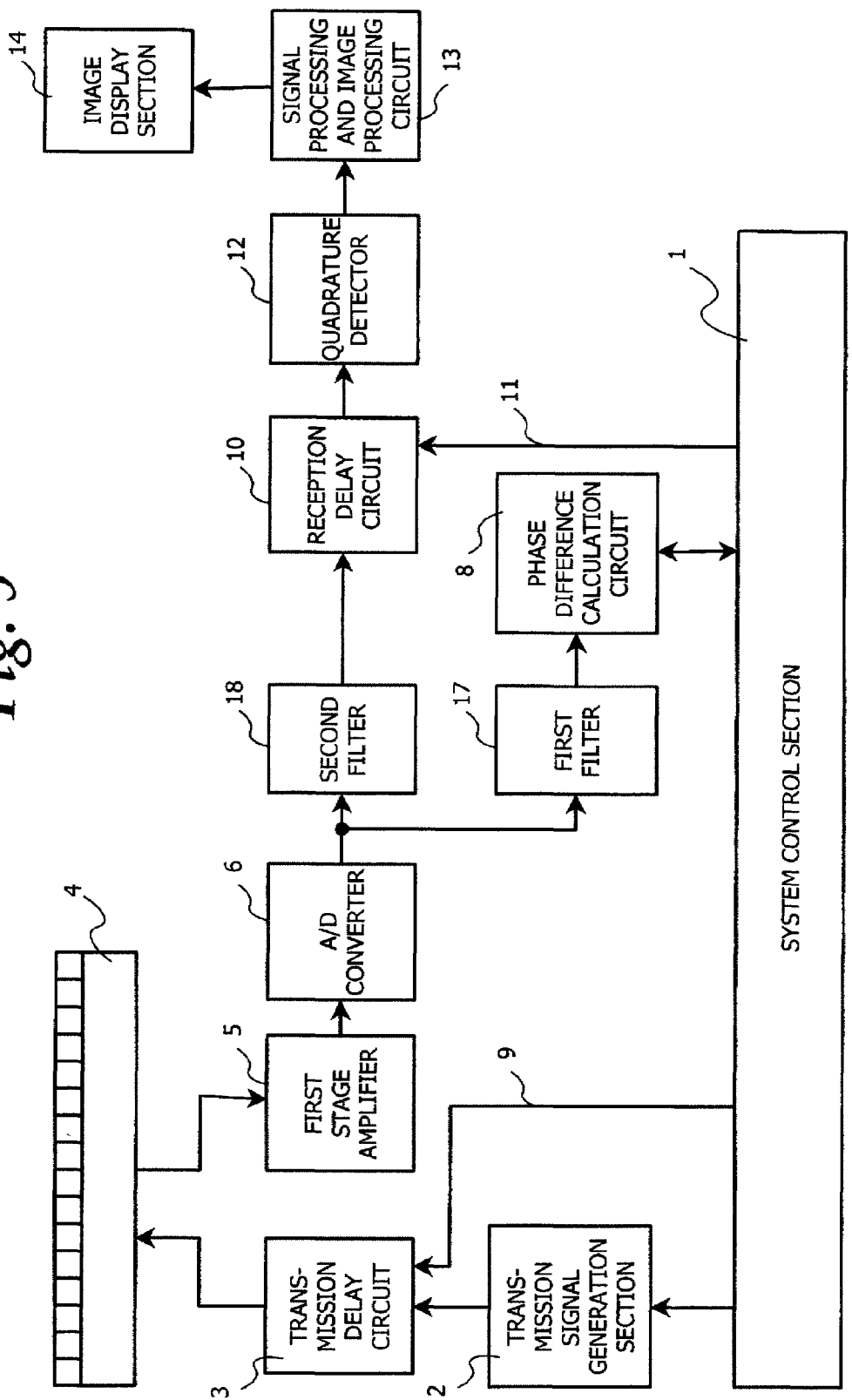
FIG. 9 is a block diagram of an ultrasound apparatus for illustrating a second embodiment.

While in the above described first embodiment, aberration correction is carried out by performing transmission and reception of ultrasound waves twice, in the second embodiment described in the following, aberration correction is carried out by performing transmission and reception of ultrasound waves once. FIG. 9 is a block diagram of an ultrasound apparatus according to the second embodiment. The process of transmission and reception of ultrasound waves is the same as that in the first embodiment. The second embodiment differs from the first embodiment in that wide band ultrasound waves are transmitted, and received ultrasound signals are discriminated by a first filter 17 and a second filter 18.

In the first embodiment, the center frequency of the first ultrasound waves used in aberration correction is 1 MHz, and the center frequency of the second ultrasound waves used in image formation is 4 MHz. Since similar processing is also performed in the second embodiment, use is made of wide band ultrasound waves containing at least first ultrasound waves having a frequency of 1 MHz and second ultrasound waves having a frequency of 4 MHz. A band pass filter that passes a frequency of 1 MHz is used as the first filter 17, and a band pass filter that passes a frequency of 4 MHz is used as the second filter 18.

Signals having passed through the first filter 17 (or first signals corresponding to reflected waves of the first ultrasound waves) are input to a phase difference calculation circuit 8. The phase difference calculation circuit 8 calculates aberration correction values, as with the first embodiment. The aberration correction values thus calculated are input to a reception delay circuit 10 after delays associated with focusing and steering have been taken into account through the system control section 1. On the other hand, signals having passed through the second filter 18 (or second signals corresponding to reflected waves of the second ultrasound waves), which are to be used in image display, are also input to the reception delay circuit 10. In the reception delay circuit 10, aberration correction is performed on the second signals using the above described aberration correction values. Then, an image is formed through a quadrature detector 12 and a signal processing and image processing circuit 13 based on the second signals after correction, and the image is displayed on an image display section 14. As described above, in this embodiment, aberration correction and imaging can be carried out by performing transmission and reception once.

Although two filters are used in this embodiment, three or more filters having different pass bands may be used to separate the received waves into three or more signals (or frequency components). In this case, aberration correction values are calculated using multiple signals among three or more signals thus separated. In the image formation process, the signal having the highest frequency among the three or more signals is used. This enables improvement in the accuracy of aberration correction and enhancement of resolution.

Third Embodiment

Figure 10:
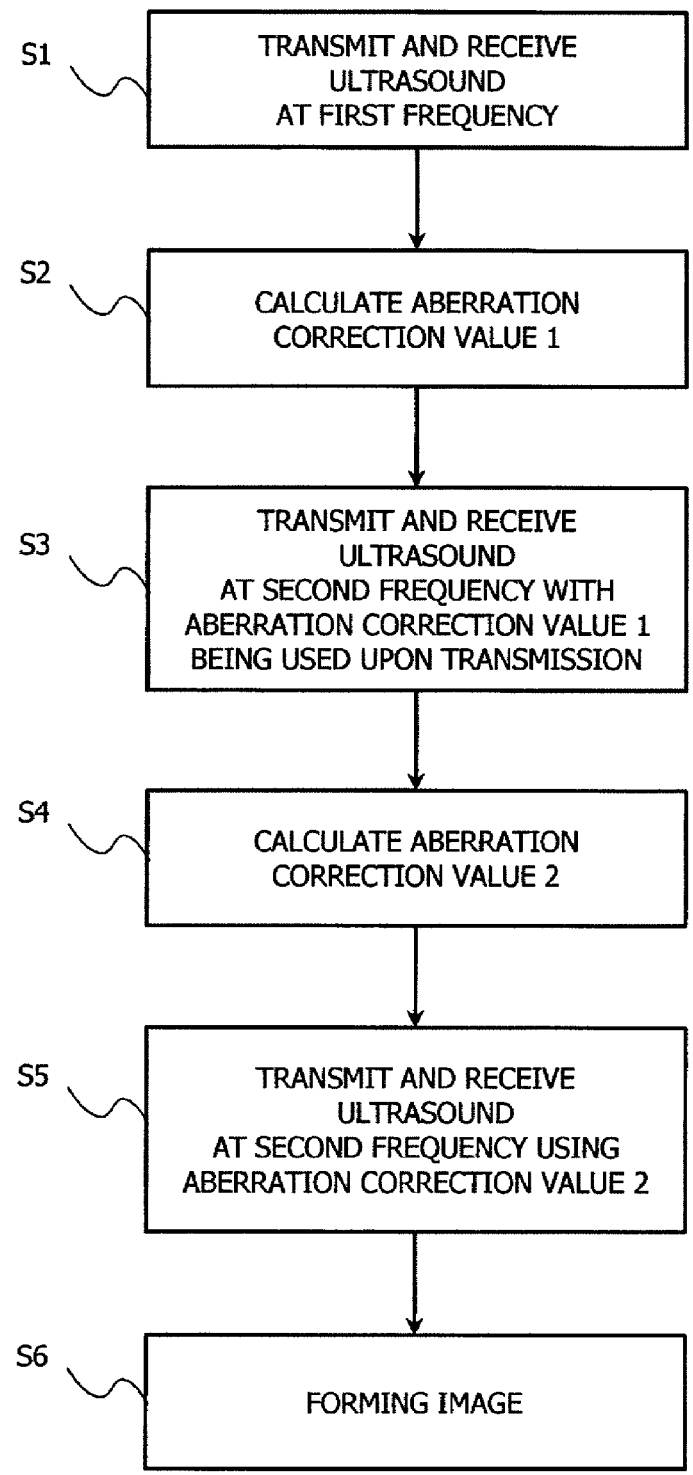
FIG. 10 is a flow chart of a process of aberration correction and imaging for illustrating a third embodiment.

While the methods according to the first and second embodiments include a single aberration correction process, this third embodiment includes a plurality of aberration correction processes. FIG. 10 illustrates a process of aberration correction in this embodiment. The ultrasound system used in this embodiment is the same as that used in the first embodiment and shown in FIG. 5.

As shown in FIG. 10, first ultrasound waves having a first frequency are transmitted first, and first signals reflected from an object are received (S1). Aberration correction values 1 are calculated by the phase difference calculation circuit 8 based on the first signals received in step S1 and stored in the system control section 1 (S2). Then, second ultrasound waves having a second frequency are transmitted and received (S3). In this transmission of the ultrasound waves, aberration correction values 1 obtained by the first transmission/reception and stored in the system control section 1 are applied.

Then, aberration correction values 2 are calculated by the phase difference calculation circuit 8 based on the second signals received in step S3 and stored in the system control section 1 (S4). Then, third signals are transmitted toward the object and reflected signals are received (S5). To the third signals thus received are applied the aberration correction values 2 obtained by the second transmission/reception and stored in the system control section 1. An image is formed from the third signals after aberration correction (S6).

According to this method, if the aberration correction values calculated based on transmission and reception of ultrasound waves having a first frequency contain errors, highly accurate correction is enabled by performing transmission and reception again using ultrasound waves having a second frequency.

In the method according to this embodiment, aberration correction is performed also at the second frequency. Similar effects can also be provided by other similar methods, such as a method in which aberration correction at a first frequency is performed repeatedly, a method in which aberration correction at a first frequency and aberration correction at a second frequency are performed repeatedly, and a method in which the frequency of the ultrasound waves is changed multiple times for aberration correction and imaging, e.g. a method in which aberration correction or imaging using ultrasound waves having a third frequency is performed in addition to aberration correction at first and second frequencies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-105039, filed on Apr. 14, 2008, which is hereby incorporated by reference herein in its entirety.

REFERENCE SIGNS LIST 1 system control section
2 transmission signal generating section
3 transmission delay circuit
4 ultrasound probe
5 first stage amplifier
6 analogue-to-digital converter
8 phase difference calculation circuit
10 reception delay circuit
9, 11 delay correction amount stored in system control section
12 quadrature detector
13 signal processing and image processing circuit
14 image display section
15 directivity of transmission beam in first embodiment (First Ultrasound: 1 MHz, and Second Ultrasound: 4 MHz)
16 directivity of transmission beam in comparative example (First Ultrasound: 4 MHz, and Second Ultrasound: 4 MHz)
17 first filter
18 second filter

The invention claimed is:

1. An image forming method for forming an image using an ultrasound signal processing apparatus to form an image using ultrasound reflected from an object when ultrasound is transmitted to the object by an ultrasound probe, where the ultrasound signal processing apparatus comprises a signal processor, the method comprising:
a first step of the ultrasound probe receiving a first reflected wave reflected from the object when first ultrasound is transmitted to the object, and generating a first signal therefrom, the first reflected wave being a reflection of a first ultrasound having a first center frequency;
a second step of the signal processor obtaining an aberration correction value based on the first signal;
a third step of the ultrasound probe receiving a second reflected wave reflected from the object when second ultrasound corrected based on the aberration correction value is transmitted to the object, and generating a second signal therefrom, the second reflected wave being a reflection of second ultrasound having a second center frequency, wherein the second center frequency is not lower than 0.5 MHz and not higher than 20 MHz, and wherein the first center frequency is not lower than $3/16$ and not higher than $9/20$ of the second center frequency; and
a fourth step of the signal processor forming an image from the aberration correction value and from the second signal obtained by transmitting, by the ultrasound probe, the second ultrasound which has been corrected based on the aberration correction value,
wherein the first center frequency is determined in such a way that the value E defined by the following formula (1) with respect to a beam pattern formed by the second ultrasound corrected using the aberration correction value falls within a predetermined range:

$$E = \sum (I(x) - P_T) i(x) j(x) \Delta x / \sum (I(x) - P_T) i(x) \Delta x \qquad (1)$$

$$i(x) = \begin{cases} 1: I(x) > P_T \\ 0: \text{other than above} \end{cases}$$

j(x): weighting function
I(x): transmitted beam power normalized by maximum power
$P_T$: threshold
x: position.

2. The image forming method according to claim 1, further comprising a step of obtaining the aberration correction value by repeatedly performing the first step and the second step multiple times before the third step, wherein the first ultrasound used in the second and subsequent repetitions in the repeatedly performing step is corrected using the aberration correction value obtained in the most recent second step.

3. The image forming method according to claim 2, wherein when the first step and the second step are repeatedly performed multiple times, the center frequency of the first ultrasound is changed from one step to another, and the center frequency of the second ultrasound is higher than the center frequency of the first ultrasound used in the last repetition.

4. The image forming method according to claim 3, wherein when the first step and the second step are repeatedly performed multiple times, the center frequency of the first ultrasound is increased at every repetition.

5. The image forming method according to claim 1, wherein the weighting function in formula (1) satisfies a condition defined by the following formula (2):

$$j(x) = \begin{cases} x^a: \text{ within main beam region} \\ bx^c: \text{ outside main beam region} \end{cases} \quad (2)$$

a,b,c: arbitrary real numbers.

6. The image forming method according to claim 5, wherein parameters a, b, c in formula (2) satisfy at least one of the following conditions: a=2, b>0, and c=0.

7. The image forming method according to claim 5, wherein the predetermined range for the value E defined by formula (1) is 8 mm or less.

8. The image forming method according to claim 1, wherein the aberration correction value used in the fourth step is an aberration correction value obtained by further correcting the aberration correction value obtained in the second step, using the second signal.

9. An image forming method for forming an image using an ultrasound signal processing apparatus to form an image using ultrasound reflected from an object when ultrasound is transmitted to the object by an ultrasound probe, where the ultrasound signal processing apparatus comprises a signal processor, the method comprising:
a first step of the ultrasound probe receiving a reflected wave reflected from the object when the ultrasound is transmitted to the object, and generating a received signal therefrom, the reflected wave being a reflection of the ultrasound, and the ultrasound containing a first ultrasound component and a second ultrasound component that have mutually different center frequencies;
a second step of the signal processor generating a first signal and a second signal from the received signal obtained in response to the transmission of the ultrasound, the first signal being indicative of the first ultrasound component in the reflected wave, and the second signal being indicative of the second ultrasound component in the reflected wave;
a third step of the signal processor obtaining an aberration correction value based on the first signal thus separated; and
a fourth step of the signal processor forming an image from the aberration correction value and from the second signal,
wherein the center frequency of the second ultrasound component is not lower than 0.5 MHz and not higher than 20 MHz, and the center frequency of the first ultrasound component is not lower than 3/16 and not higher than 9/20 of the center frequency of the second ultrasound component.

10. The image forming method according to claim 9, wherein the second step comprises generating the first signal and the second signal from the received signal using a first filter that passes the first signal and a second filter that passes the second signal, and a pass band of the first filter is set in such a way that the value defined by the following formula (1) with respect to a beam pattern of the second ultrasound component corrected using the aberration correction value falls within a predetermined range:

$$E = \sum (I(x) - P_T)i(x)j(x)\Delta x / \sum (I(x) - P_T)i(x)\Delta x \quad (1)$$

$$i(x) = \begin{cases} 1: I(x) > P_T \\ 0: \text{ other than above} \end{cases}$$

j(x): weighting function
I(x): transmitted beam power normalized by maximum power
$P_T$: threshold
x: position.

11. The image forming method according to claim 10, wherein
ultrasound containing three or more ultrasound components having different center frequencies is used in the first step,
three or more signals are generated from the received signal using a plurality of filters having pass bands respectively corresponding to the frequencies of the three or more ultrasound components in the second step,
a plurality of signals among the three or more signals generated in the third step is used as the first signal, and
a signal having the highest frequency among the three or more signals separated in the third step is used as the second signal in the fourth step.

12. The image forming method according to claim 9, wherein the aberration correction value used in the fourth step is an aberration correction value obtained by further correcting the aberration correction value obtained in the second step, using the second signal.

13. An aberration correction method for correcting aberrations using an ultrasound signal processing apparatus to form an image using ultrasound reflected from an object when ultrasound is transmitted to the object by an ultrasound probe, where the ultrasound signal processing apparatus comprises a signal processor that performs signal processing, the method comprising:
a first step of the ultrasound probe receiving a first reflected wave reflected from the object when first ultrasound is transmitted to the object, wherein the first reflected wave is a reflection of the first ultrasound and the first ultrasound has a first center frequency, and generating a first signal therefrom;
a second step of the signal processor obtaining an aberration correction value based on the first signal;
a third step of the ultrasound probe receiving a second reflected wave reflected from the object when second ultrasound corrected based on the aberration correction value is transmitted to the object, wherein the second ultrasound has a second center frequency that is different from the first center frequency, and generating a second signal therefrom; and
a fourth step of the signal processor further correcting the aberration correction value obtained in the second step, using the second signal,
wherein the center frequency of the second ultrasound is not lower than 0.5 MHz and not higher than 20 MHz,
wherein the center frequency of the first ultrasound is not lower than 3/16 and not higher than 9/20 of the center frequency of the second ultrasound, and
wherein the center frequency of the first ultrasound is determined in such a way that the value E defined by the following formula (1) with respect to a beam pattern formed by the second ultrasound corrected using the aberration correction value falls within a predetermined range:

$$E = \sum (I(x) - P_T)i(x)j(x)\Delta x \bigg/ \sum (I(x) - P_T)i(x)\Delta x \quad (1)$$

$$i(x) = \begin{cases} 1: & I(x) > P_T \\ 0: & \text{other than above} \end{cases}$$

j(x): weighting function
I(x): transmitted beam power normalized by maximum power
$P_T$: threshold
x: position.

14. The aberration correction method according to claim 13, wherein the predetermined range for the value E defined by formula (1) is 8 mm or less.

15. An aberration correction method for correcting aberrations using an ultrasound signal processing apparatus to form an image using ultrasound reflected from an object when ultrasound is transmitted to the object by an ultrasound probe, where the ultrasound signal processing apparatus comprises a signal processor, the method comprising:

a first step of the ultrasound probe receiving a reflected wave reflected from the object when ultrasound containing at least first ultrasound and second ultrasound having different center frequencies is transmitted to the object, wherein the reflected wave contains reflections of the first ultrasound and of the second ultrasound, and generating a received signal therefrom;

a second step of the signal processor generating a first signal and a second signal from the received signal, the first signal being a reflected wave of the first ultrasound, and the second signal being a reflected wave of the second ultrasound;

a third step of the signal processor obtaining an aberration correction value based on the first signal; and a fourth step of the signal processor further correcting the aberration correction value obtained in the third step, using the second signal, wherein the center frequency of the second ultrasound is not lower than 0.5 MHz and not higher than 20 MHz, and wherein the center frequency of the first ultrasound is not lower than 3/16 and not higher than 9/20 of the center frequency of the second ultrasound.

* * * * *